US011880810B1

(12) United States Patent
Glass et al.

(10) Patent No.: US 11,880,810 B1
(45) Date of Patent: Jan. 23, 2024

(54) SYSTEMS AND METHODS FOR SECURELY SHARING PUBLIC BLOCKCHAIN ADDRESSES

(71) Applicant: Citibank, N.A., New York, NY (US)

(72) Inventors: Lior Glass, New York, NY (US); Ryan Marsh, London (GB); Puneet Singhvi, New York, NY (US)

(73) Assignee: CITIBANK, N.A., New York, NY (US)

( * ) Notice: Subject to any disclaimer, the term of this patent is extended or adjusted under 35 U.S.C. 154(b) by 0 days.

(21) Appl. No.: 17/886,387

(22) Filed: Aug. 11, 2022

(51) Int. Cl.
 *G06Q 20/06* (2012.01)
 *G06Q 20/38* (2012.01)
(52) U.S. Cl.
 CPC ......... *G06Q 20/065* (2013.01); *G06Q 20/389* (2013.01); *G06Q 20/38215* (2013.01)
(58) Field of Classification Search
 CPC .................. G06Q 20/00–425; H04L 9/00–50
 See application file for complete search history.

(56) References Cited

U.S. PATENT DOCUMENTS

| | | | |
|---|---|---|---|
| 11,276,054 B1 * | 3/2022 | Tomkins | G06Q 20/027 |
| 2017/0243193 A1 * | 8/2017 | Manian | G06Q 20/3829 |
| 2018/0046992 A1 * | 2/2018 | Hanrahan | H04L 9/50 |
| 2020/0151686 A1 * | 5/2020 | Komandur | G06F 16/2315 |

OTHER PUBLICATIONS

Andreas M. Antonopoulos, Mastering Bitcoin, 2014 (Year: 2014).*

* cited by examiner

*Primary Examiner* — Ari Shahabi
(74) *Attorney, Agent, or Firm* — Foley & Lardner LLP (57) ABSTRACT

A system includes a first processor configured to transmit to a second processor via a secure network session, a first payload configured for a transaction in a public blockchain network including a transaction amount, and a wallet address of a cryptocurrency account, and, in response to receiving, from a blockchain node associated with the cryptocurrency account, an indication that the cryptocurrency account has received a first monetary amount via the public blockchain network, transmit, to the second processor via the secure network session, a second payload indicating the first monetary amount that is less than the transaction amount. In response to the second processor validating the first monetary amount, the second processor transmits, using a blockchain node associated with the cryptocurrency account, a remainder of the transaction amount to the cryptocurrency account via the public blockchain network.

14 Claims, 8 Drawing Sheets

SYSTEMS AND METHODS FOR SECURELY SHARING PUBLIC BLOCKCHAIN ADDRESSES

TECHNICAL FIELD

This application relates generally to systems and methods for securely sharing or exchanging public blockchain addresses across computing systems.

BACKGROUND

As the processing power of computers allow for greater computer functionality and the Internet technology era allows for interconnectivity between computing systems, virtual currency (or cryptocurrency) exchange has become ubiquitous. Conventionally, virtual currency exchange platforms allow users to use distributed computing infrastructures to transfer virtual currencies to other users. However, conventional virtual currency exchange platforms suffer from a technical shortcoming. In conventional platforms, validating the address of the recipient on public blockchains may be a challenge. Because transactions on public blockchains are irreversible, validating or securely sharing public blockchain addresses is important. However, there is a lack of sufficient industry standards or services for validating or securely sharing blockchain addresses. A recipient provides a wallet address for sending cryptocurrency and/or a digital asset (e.g., Bitcoin) to the recipient on public blockchains. The owner of the wallet address holds a private key that allows the owner to claim the transaction and gain control over the digital assets sent. Thus, it is critical to determine and validate an address of a counterparty on a public blockchain. Unfortunately, when the owner of the wallet is an organization (e.g., financial institution), secure sharing and validating of blockchain addresses may be challenging because most financial institutions prefer not to expose their addresses publicly. In some cases, the organizations may want to use new address for each transaction, for example. Improvements in securely sharing or exchanging public blockchain addresses across computing systems remain desired.

SUMMARY

Disclosed herein are systems and methods capable of addressing the above described shortcomings and may also provide any number of additional or alternative benefits and advantages. Embodiments described herein provide for systems and methods that securely share or exchange public blockchain addresses across participants (e.g., sender/receiver who sends/receives a monetary amount) or across computing systems of participants.

In an embodiment, a method for cryptocurrency transactions may include after establishing a secure network session between a first processor (e.g., a processor of a receiver) and a second processor (e.g., a processor of a sender), transmitting, by the first processor to the second processor via the secure network session, a first payload configured for a transaction in a public blockchain network including a transaction amount, a first transaction identifier, and a wallet address of a cryptocurrency account corresponding to the secure network session. The method may include in response to receiving, by the first processor from at least one blockchain node associated with the cryptocurrency account, an indication that the cryptocurrency account has received a first monetary amount via the public blockchain network, automatically generating and transmitting, by the first processor to the second processor via the secure network session, a second payload including an indication of the first monetary amount and a second transaction identifier associated with the first monetary amount, the first monetary amount being less than the transaction amount. The method may include in response to the second processor validating the second transaction identifier and the first monetary amount, receiving, by the first processor from the second processor, using at least one blockchain node associated with the cryptocurrency account, a second monetary amount representing a remainder of the transaction amount to the cryptocurrency account via the public blockchain network.

In another embodiment, a method for cryptocurrency transactions may include receiving, by a first processor (e.g., a sender device) from a second processor (e.g., a receiver device) via a secure network session, a first payload including a transaction amount, a first transaction identifier, and a wallet address of a cryptocurrency account unique to the secure network session. The method may include transmitting, by the first processor via at least one blockchain node associated with the cryptocurrency account using a public blockchain network, a first monetary amount to the cryptocurrency account. The method may include receiving, by the first processor via the secure network session, a second payload including an indication of the first monetary amount and a second transaction identifier associated with the first monetary amount, the first monetary amount being less than the transaction amount. The method may include in response to validating the second transaction identifier and the first monetary amount, transmitting, by the first processor using at least one blockchain node associated with the cryptocurrency account, a second monetary amount representing a remainder of the transaction amount to the cryptocurrency account via the public blockchain network.

In yet another embodiment, a system may include a first processor (e.g., a receiver device) configured to after establishing a secure network session between the first processor and a second processor (e.g., a sender device), transmit to the second processor via the secure network session, a first payload configured for a transaction in a public blockchain network including a transaction amount, a first transaction identifier, and a wallet address of a cryptocurrency account corresponding to the secure network session. The first processor may be configured to, in response to receiving, from at least one blockchain node associated with the cryptocurrency account, an indication that the cryptocurrency account has received a first monetary amount via the public blockchain network, automatically generate and transmit, to the second processor via the secure network session, a second payload comprising an indication of the first monetary amount and a second transaction identifier associated with the first monetary amount, the first monetary amount being less than the transaction amount. In response to the second processor validating the second transaction identifier and the first monetary amount, the second processor transmits, using at least one blockchain node associated with the cryptocurrency account, a second monetary amount representing a remainder of the transaction amount to the cryptocurrency account via the public blockchain network.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification, illustrate an embodiment of the invention, and together with the specification, explain the invention.

DETAILED DESCRIPTION

Reference will now be made to the embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

One approach is to develop an industry standard or service for validating or securely sharing blockchain addresses, which would be the equivalent of public certificate authority (CA) or transport layer security (TLS) for the Internet. However, it would be challenging to build a highly trustable industry standard or service. Another approach is to establish a secure private network like a virtual private network (VPN) for securely sharing or exchanging public blockchain addresses. However, such network may only solve the issue of securely connecting two parties and does not validate the identity of the parties and does not include any system to exchange addresses. One example of this approach is "walled gardens," which are private networks created on top of public blockchains. This solution would require the counterparty to join the private network and would typically involve deploying specialized software and entering into a legal agreement with the network facilitator. In addition, the solution and network would be operated by the network facilitator, which might not be suitable for cryptocurrency transactions between financial institutions.

In an attempt to solve these problems, according to certain aspects, embodiments in the present disclosure relate to techniques for using an existing secure network infrastructure to advertise and validate public blockchain addresses and to validate transactions. Public blockchain addresses may be wallet addresses of cryptocurrency accounts (e.g., public key of Bitcoin wallet address) or public keys of mobile wallets (e.g., mobile wallets in iOS and Android). The secured network infrastructure may be one or more secure networks for exchanging payments between financial transactions, for example, SWIFTNet, which can provide various functionalities (e.g., authentication, routing, etc.) for exchanging payments. Such secure networks can provide a high level of security so that it also can be used for authentication and validation of public blockchain addresses. Before sending an amount of cryptocurrency to a recipient using a public blockchain network, a sender may be authenticated by an existing authentication mechanism of a secure network which is different from the public blockchain network.

A system can securely share public blockchain addresses between computing devices using standard messages (or message formats) provided in an existing secure network. For example, a sender computing device and a recipient computing device can communicate with each other using messages relating to a cryptocurrency transaction which are generated or composed on top of standard messages of the existing secure network. Because banks may use the secure network and the transaction-related message formats for non-cryptocurrency transactions, the cryptocurrency-related content in the transaction-related message formats may be uniquely identified by sender/recipient computing devices as compared to messages involving other transactions.

A party and a counterparty for cryptocurrency transactions (e.g., sender/recipient computing devices) may have deployed hardware/software that can use a secure network for securely sharing public blockchain addresses. A party can implement or deploy hardware/software in a manner different from that of a counterparty as long as the hardware/software meets common protocol guidelines between the parties.

A system may include a first processor configured to after establishing a secure network session between the first processor and a second processor, transmit to the second processor via the secure network session, a first payload configured for a transaction in a public blockchain network including a transaction amount, a first transaction identifier, and a wallet address of a cryptocurrency account corresponding to the secure network session. The first processor may be configured to, in response to receiving, from at least one blockchain node associated with the cryptocurrency account, an indication that the cryptocurrency account has received a first monetary amount via the public blockchain network, automatically generate and transmit, to the second processor via the secure network session, a second payload comprising an indication of the first monetary amount and a second transaction identifier associated with the first monetary amount, the first monetary amount being less than the transaction amount. The first processor may be configured to, in response to the second processor validating the second transaction identifier and the first monetary amount, the second processor transmits, using at least one blockchain node associated with the cryptocurrency account, a second monetary amount representing a remainder of the transaction amount to the cryptocurrency account via the public blockchain network.

At least one of the first payload or the second payload may be encrypted. The second processor may verify an integrity of the second payload before transmitting the second monetary amount.

The second processor may verify an integrity of the first payload or the second payload using metadata associated with each respective payload.

The first processor may be further configured to establish an authenticated session when at least one of an integrity of the second payload has been verified by the second processor or the first processor verifies that the transaction amount has been received. The first processor may be further configured to transmit, to the second processor via the secure network, a third payload comprising a second monetary amount and a third transaction identifier, and receive, from at least one node associated with the cryptocurrency account, a second indication that the cryptocurrency account has received the second monetary amount.

At least one of the first transaction identifier or the second transaction identifier may be unique to the second processor.

At least one of the first transaction identifier or the second transaction identifier may be unique to the transaction.

The first payload may include a plurality of transaction amounts corresponding to a plurality of transactions associated with the second processor, a plurality of first transaction identifiers, and a plurality of wallet addresses of one or more cryptocurrency accounts.

Embodiments herein may provide useful techniques for using an existing secure network which can provide a high level of security so that a sender of cryptocurrency can be authenticated by existing authentication mechanisms of the secure network.

Further, embodiments herein may provide useful techniques for leveraging existing connectivity or secure network infrastructure, thereby not requiring additional external interfaces. Systems and methods according to these techniques can protect senders/recipients of cryptocurrency against risks such as man-in-the-middle-attacks and "fat finger" errors. Systems and methods according to some implementations can be directly integrated into a policy engine, thereby avoiding the need to limit transactions to a set of static addresses and improving security.

Figure 1:
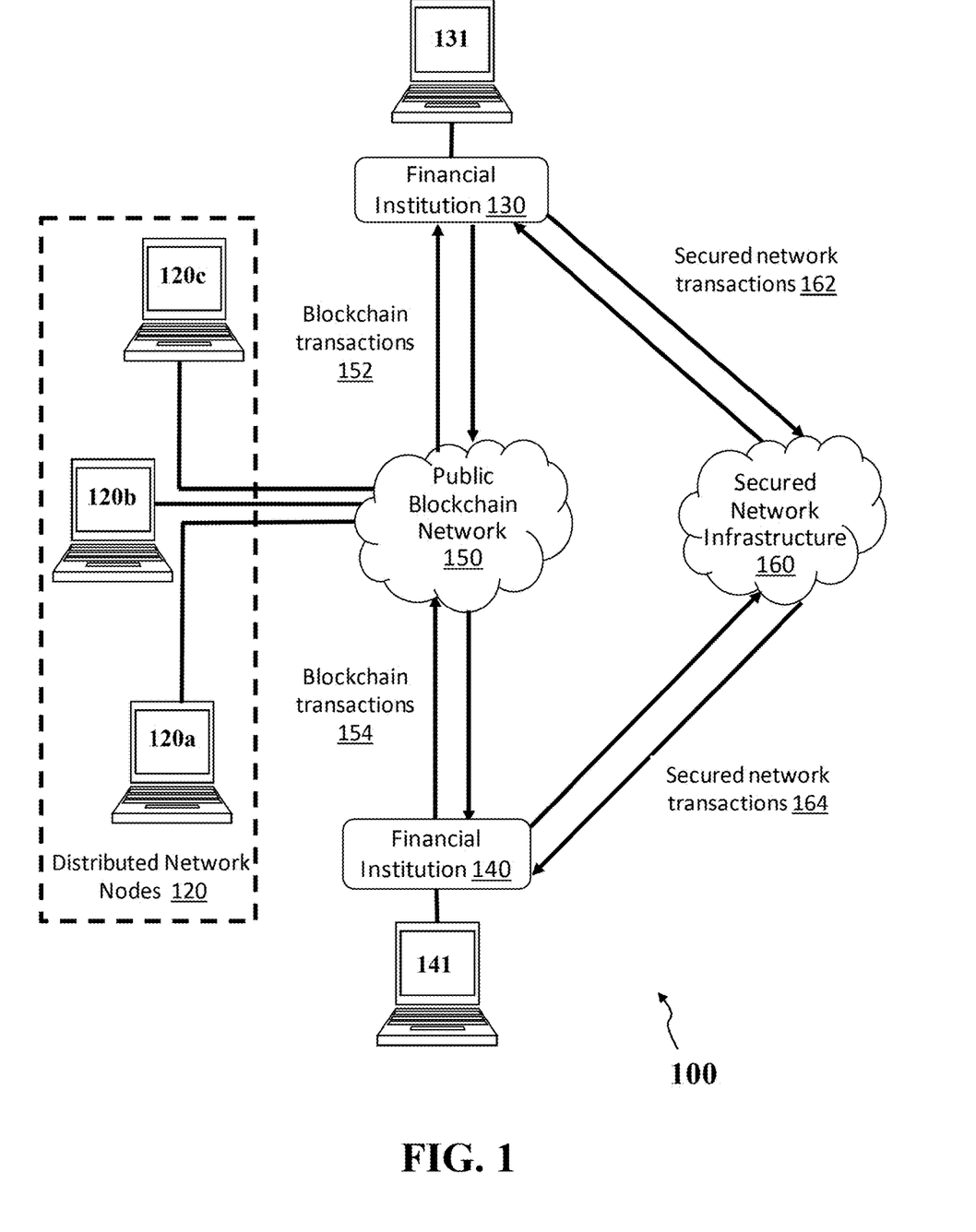
FIG. 1 illustrates an example of a computer system for securely sharing or exchanging public blockchain addresses across computing systems, according to an embodiment.

FIG. 1 illustrates another example of a computer system 100 for securely sharing public blockchain addresses across computing systems, according to an embodiment. The computer system 100 may include distributed network nodes 120a-c, a computing device or first client device 131 (e.g., a computing device of a financial institution 130), and a computing device or second client device 141 (e.g., a computing device of another financial institution 140). The computing device 131 and the computing device 141 may perform blockchain transactions 152, 154 (e.g., transfer of cryptocurrency between the devices) via a public blockchain network 150. The computing device 131 and the computing device 141 may communicate with each other for secure network transactions 162, 164 (e.g., authentication and/or validation of cryptocurrency transactions) via a secured network infrastructure 160. The secured network infrastructure 160 may be one or more secure networks for exchanging payments between financial transactions, for example, SWIFTNet, which can provide various functionalities (e.g., authentication, routing, etc.) for exchanging payments. Such secure networks can provide a high level of security so that it also can be used for authentication and validation of public blockchain addresses.

Aspects of the system 100 may be configured to employ and manage a system blockchain (e.g., system blockchain 200 in FIG. 2), sometimes referred to as a "distributed ledger," and may include blockchain-based distributed ledger software. The system blockchain may operate as a distributed database that stores data records associated with users and transaction documents, where the data records stored on the system blockchain may be blocks of data (e.g., block instances or blocks) that are hosted on distributed network nodes 120a-c. As described herein, hosted data may refer to data being locally stored or otherwise in possession of or accessible by each distributed node, such as being remotely hosted or hosted in a cloud. Each network node within the distributed network nodes 120a-c (e.g., creator of the block instance) or a client device (e.g., first client device 131 or second client device 141) may prevent others within system 100 from accessing at least portions of the data within one or more block instances. For example, while generating a block instance, a portion of the data within the block instance may be designated as private. For example, a portion of the blockchain may be encrypted so one or more network nodes are unable to access the encrypted portion.

A client device (e.g., first client device 131 or second client device 141) may generate and display a user interface on each node within the distributed network nodes 120a-c. The client device may execute software applications configured to display the user interface (e.g., host a website), which may generate and serve various webpages to each network node within the distributed network nodes 120a-c. The client device may also generate, access, and update blockchain instances hosted on network nodes 120a-c, according to instructions received by the client device and/or any of the nodes within the network nodes 120a-c. The client device may instruct network nodes 120a-c to update the instances of the system blockchain stored locally on each of the network nodes 120a-c.

The client device may also generate each new block instance with a timestamp or other data that links the new block instance with existing block instances on the blockchain. As an example, when the client device generates a new user record, the client device then generates a hash value for the user based upon one or more data fields of the user record. The client device may then generate a new block instance for the system blockchain within the local instance of the blockchain stored in a database. The client device then transmits the updated block instance to each respective network node 120a-c. The network nodes 120a-c, in turn, may update the local instances of the blockchain stored on each of the network nodes 120a-c by appending the newly generated block instance to the existing blockchain.

Network nodes 120a-c may represent one or more users of an exchange platform. A network node 120a-c may be any computing device comprising a processor and a non-transitory machine-readable storage medium capable of performing the various tasks and processes described herein. Non-limiting examples of a network node may be a workstation computer, laptop computer, tablet computer, and server computer. Although the network nodes 120a-c are described as storing blocks of the blockchain in FIG. 1, other computing devices may host blocks of the blockchain. Each network node 120a-c locally stores an instance of the system blockchain in the storage medium of the system blockchain, and further executes a software application that instructs the network node 120a-c on generating and querying blocks within the locally stored blockchain instance.

In operation, a node of network node 120 may generate new blocks on a locally stored instance of the system blockchain according to data received from a computing device (e.g., client device or server device) or other network nodes 120a-c. The computing device may instruct one or more of the network nodes 120a-c to update the blockchain stored in their local storage (e.g., local database). Moreover, in order to execute the query of the blocks on the system blockchain, the computing device may poll the network nodes 120a-c to determine the most recent data on the system blockchain (e.g., latest valid blockchain).

A client device (e.g., first client device 131 or second client device 141) may be any computing device allowing a user/user to use blockchain services with blockchain instances hosted on network nodes 120a-c. The client device can generate, access, and update blockchain instances hosted on network nodes 120a-c, according to instructions received from the client device so as to provide blockchain services to the client device. The first client device 131 and the second client device 141 may perform blockchain transactions via the public blockchain network 150. The first client device 131 and the second client device 141 may communicate with each other for secure network transactions via the secured network infrastructure 160. In an example described herein, the first client device 131 may be a sender of a cryptocurrency to the second client device 141 that acts as a recipient.

Figure 2:
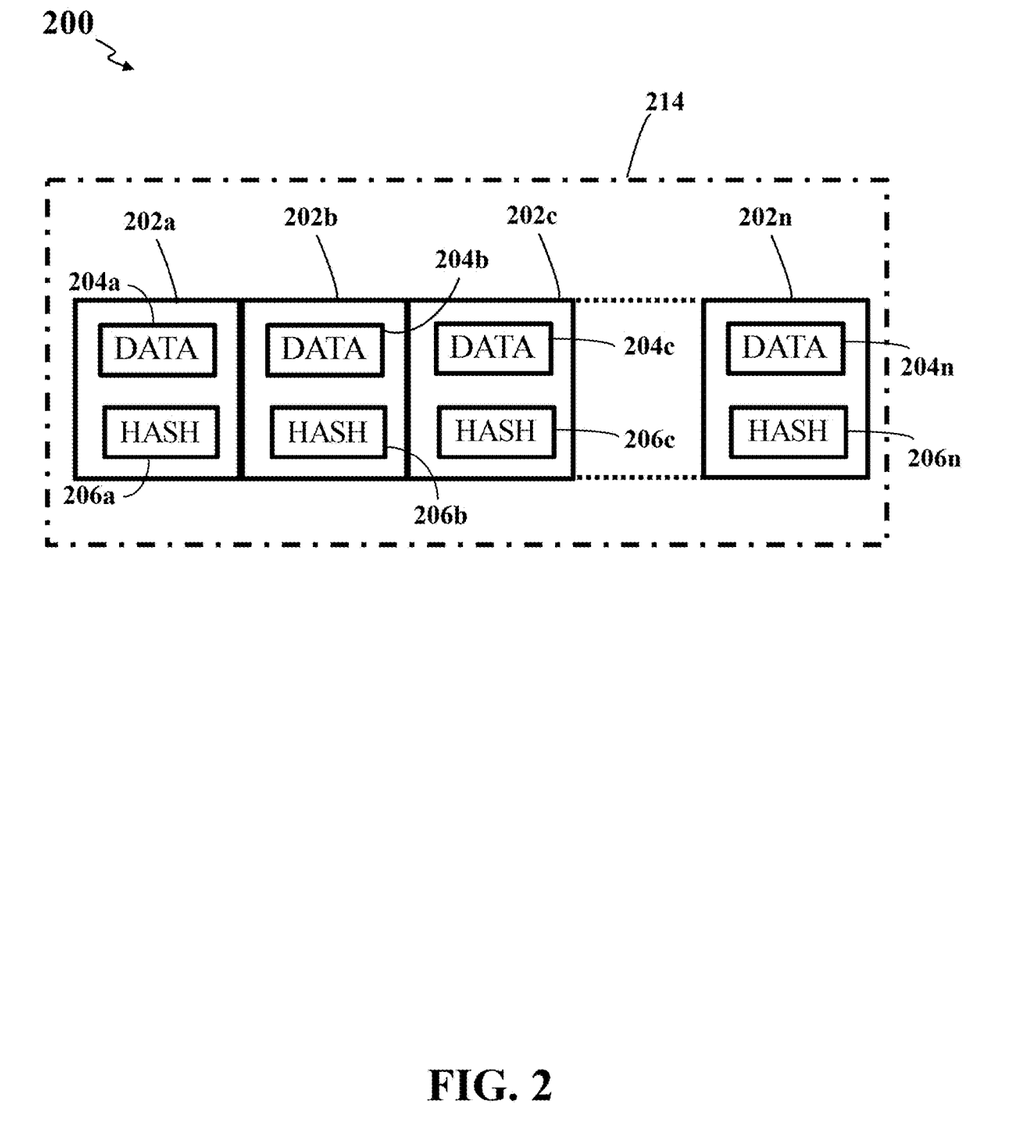
FIG. 2 graphically illustrates an example of appending multiple block instances, according to an embodiment.

Referring now to FIG. 2, an example of a system blockchain 200 comprising different block instances is illustrated. As depicted in FIG. 2, a blockchain 214 comprising block instances 202a-202n (collectively 202) may include data 204a-204n (collectively 204) that enables information, such as transaction data (e.g., transaction attributes and values), machine-readable code/documents, and other metadata associated with one or more transactions of the peer nodes described above. The block instances 202 may also contain hash values 206a-206n (collectively 206) that are used to link each of the block instances to the preceding block instance, as understood in the art.

In some configurations, additional information, such as an identifier associated with peer nodes adding or updating the data could also be included within the blockchain or incorporated into the hash value. As an example, if a peer node adds any data to the blockchain, an identifier associated with the computing device that contributed to creating the data may be included in the respective block. In some embodiments, the identifier may include a time stamp (e.g., data regarding the time of data modification or creation) and/or a geolocation (e.g., data regarding the location within which the data modification or creation has occurred or has a value based on the user's geo-location). The identifier may also be incorporated within the hash value and may be used by the analytic nodes as a part of the hashing algorithm. Such identification information may be used as a veracity scale factor that the information is true and accurate.

The analytic nodes may transmit the blockchain instances to all the peer nodes of the blockchain to preserve the integrity of the blockchain. A hash function may apply an algorithm (or key) to map data of an arbitrary size to fixed-size values, and a resulting hash value (may also be referred to a hash code, digest, or hash) can uniquely identify the data. For example, the analytic nodes may transmit the hash value 206c (e.g., the hash value generated for block instance 202c based on data 204c received from a third node) to the first node (e.g., the first computing device associated with the block instance 202a) and the second node (e.g., the second computing device associated with the block instance 202b). Consequently, when the nodes of the blockchain are polled, they will not verify the modified block.

Modification of data within a block instance may disconnect that block instance from the blockchain. The analytic nodes may use this method to combat possible fraud or unauthorized modification of the data within blockchain instances. For example, if the second administrator using the second computing device modifies data 204b within block instance 202b, the hash value 206b will also be modified. As explained above the hash value 206b may be based on (or at least partially based on) data 204b; therefore if data 204b is modified, hash value 206b will also be modified. Modification of the data 204b or the hash value 206c may break the link between block instance 202b and block instance 202c because hash value 206c is at least in part generated based on hash value 206b.

Figure 3:
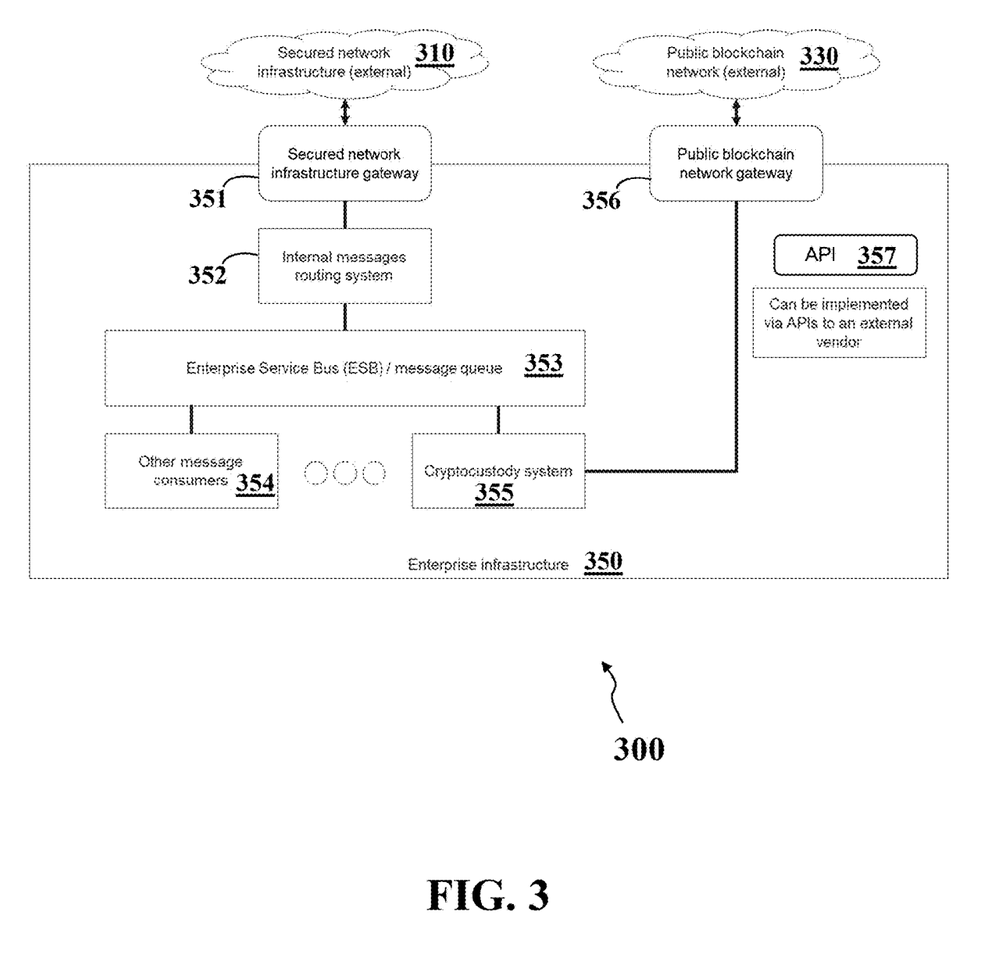
FIG. 3 illustrates an example of a computer system for securely sharing or exchanging public blockchain addresses across computing systems, according to an embodiment.

FIG. 3 illustrates an example of a computer system 300 for securely sharing public blockchain addresses across computing systems, according to an embodiment. The computer system 300 may include an enterprise infrastructure 350 (as a sender/recipient of cryptocurrency) which may communicate with another computing device (as a sender/recipient of cryptocurrency) via a secured network infrastructure 310. The secured network infrastructure 310 may have configuration similar to that of the secured network 160 in FIG. 1. The enterprise infrastructure 350 and another computing device may perform blockchain transactions (e.g., transfer of cryptocurrency) via a public blockchain network 330. The public blockchain network 330 may have configuration similar to that of the public blockchain network 150 in FIG. 1. The computing system 300 may be an example implementation of the computing system 100 illustrated in FIG. 1. Therefore, the features illustrated in these figures may be a part of the same or similar systems. For example, at least one of the computing devices 131, 141 may be implemented as an enterprise infrastructure 350.

The enterprise infrastructure 350 may include one or more message consumers 354, enterprise service bus (ESB)/message queue 353, an internal messages routing system 352, and/or a secured network infrastructure gateway 351, which are configured to collectively perform a secure message processing. For example, upon receiving a message via the secured network infrastructure gateway 351 from the secured network infrastructure 310, the system 300 may perform message routing via the internal messages routing system 352 and forward or send the message to a destination (e.g., message consumers 354 or cryptocustody system 355) via the message queue 353. The cryptocustody system 355 can use blockchain services by generating, accessing, and updating blockchain instances hosted on network nodes (e.g., network nodes 120a-c in FIG. 1) via the public blockchain network gateway way 356. The enterprise infrastructure 350 may include an application programming interface (API) 357. Using the API 357, secure sharing of public blockchain addresses can be implemented via the API to one or more external vendors.

Figure 4:
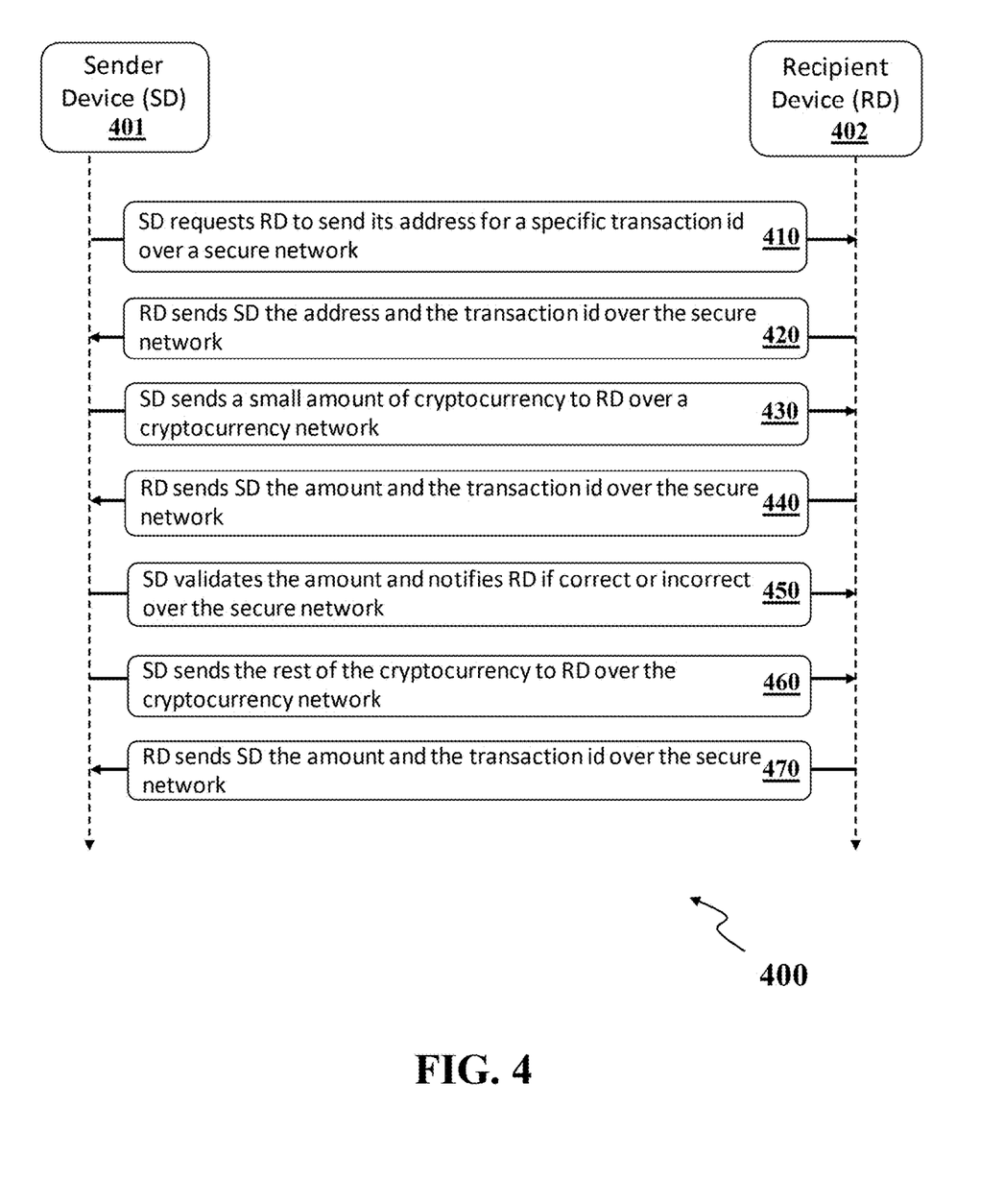
FIG. 4 illustrates a flow of securely sharing or exchanging public blockchain addresses across computing systems, according to an embodiment.

FIG. 4 illustrates an example flow 400 of securely sharing public blockchain addresses across computing systems, according to an embodiment. A system for securely sharing public blockchain addresses across computing devices may include a first computing device (e.g., a sender device SD 401 of a first bank as sender of cryptocurrency) and a second computing device (e.g., a recipient device RD 402 of a second bank as recipient of cryptocurrency). Each of the sender device SD 401 and the recipient device RD 402 may have configuration similar to that of client device 131, 141 (see FIG. 1). Each of the sender device SD 401 and the recipient device RD 402 may have configuration similar to that of enterprise infrastructure 350 (see FIG. 3).

The sender device SD 401 or recipient device RD 402 may establish a secure network session between the sender device SD 401 and the recipient device RD 402. The secure network session may be established over a secure network such as a secured network 160 (see FIG. 1) or a secured network infrastructure 310 (see FIG. 3).

At step 410, the sender device SD 401 may send, to the recipient device RD 402 via the secure network (session), a request for sending its blockchain address (e.g., a wallet address of the device RD's cryptocurrency account) for a specific transaction identifier for a transaction of sending a transaction amount of cryptocurrency (e.g., 0.001 Bitcoin).

At step 420, in response to receiving the request, the recipient device RD 402 may send, to the sender device SD

401 via the secure network (session), (1) a blockchain address of the recipient device RD 402 and (2) the transaction identifier. For example, the recipient device RD 402 may transmit to the sender device SD 401 via the secure network session, a first payload configured for the transaction in a public blockchain network. The first payload may include a transaction amount (e.g., 0.001 Bitcoin), a first transaction identifier corresponding to the transaction, and a wallet address of a cryptocurrency account (e.g., public key of the cryptocurrency account) corresponding to the secure network session.

At step 430, the sender device SD 401 may send a small amount of cryptocurrency to the recipient device RD 402 over a cryptocurrency network. The cryptocurrency network may have configuration similar to that of one or more network 150 (see FIG. 1) or public blockchain network 330 (see FIG. 3). For example, the sender device SD 401 may transmit via at least one blockchain node (e.g., blockchain instances hosted on network nodes 120*a-c* in FIG. 1) associated with a cryptocurrency account using the public blockchain network, a first monetary amount (e.g., 0.0002 Bitcoin) which is less than the transaction amount (0.001 Bitcoin), to the cryptocurrency account.

At step 440, the recipient device RD 402 may send, to the sender device SD 401 via the secure network session, the amount received at its cryptocurrency account (e.g., 0.0000002 Bitcoin) and the transaction identifier. The recipient device RD 402 may receive, from at least one blockchain node associated with the cryptocurrency account, an indication that the cryptocurrency account has received a first monetary amount (e.g., 0.0000002 Bitcoin) via the public blockchain network.

In response to receiving, from at least one blockchain node associated with the cryptocurrency account, an indication that the cryptocurrency account has received a first monetary amount via the public blockchain network, the recipient device RD 402 may generate and automatically transmit to the sender device SD 401 via the secure network session, a second payload including the first monetary amount (e.g., 0.0000002 Bitcoin) and a second transaction identifier associated with the first monetary amount that is less than the transaction amount.

At step 450, upon receiving the second payload, the sender device SD 401 may validate or verify the first monetary amount and notify (or send an indication to) the recipient device RD 402 if correct or incorrect, via the secure network session.

At step 460, the sender device SD 401 may send the rest of the cryptocurrency (e.g., 0.001 Bitcoin−0.0000002 Bitcoin=0.00099908 Bitcoin) to the recipient device RD 402. In response to validating the second transaction identifier and the first monetary amount, the sender device SD 401 may transmit, using at least one blockchain node associated with the cryptocurrency account, a second monetary amount (e.g., 0.00099908 Bitcoin) representing a remainder of the transaction amount to the cryptocurrency account via the public blockchain network. The recipient device RD 402 may receive, from at least one node associated with the cryptocurrency account, a second indication that the cryptocurrency account has received the second monetary amount.

At step 470, the recipient device RD 402 may send, to the sender device SD 401 via the secure network session, the amount (e.g., 0.00099908 Bitcoin) and a transaction identifier (e.g., a transaction identifier associated with a transaction of the second monetary amount).

The flow 400 for securely sharing public blockchain addresses between the sender device SD 401 and the recipient device RD 402 may use two channels including a secure network session (e.g., SWIFT network) and a public blockchain network (e.g., Bitcoin network). The secure network session can be used as just a medium or pipeline for exchanging messages relating to transactions. The flow 400 may use a secure network that supports a free form message. For example, the flow 400 may use, as a secure network, an instant messaging service aimed at financial firms, supporting encryption, group messaging, rich content sharing and third-party plugins (such as Symphony Communication Services).

The sender device SD 401 and recipient device RD 402 may exchange or share different transaction identifiers respectively associated with different transactions (e.g., a full transaction of 0.001 Bitcoin, and two partial transactions of 0.0000002 Bitcoin and 0.00099908 Bitcoin). The recipient device RD 402 can send a public key separately from its public blockchain address, so that messages can be encrypted using the public key. The flow 400 may be implemented using an API (e.g., API 357 in FIG. 3).

Figure 5A:
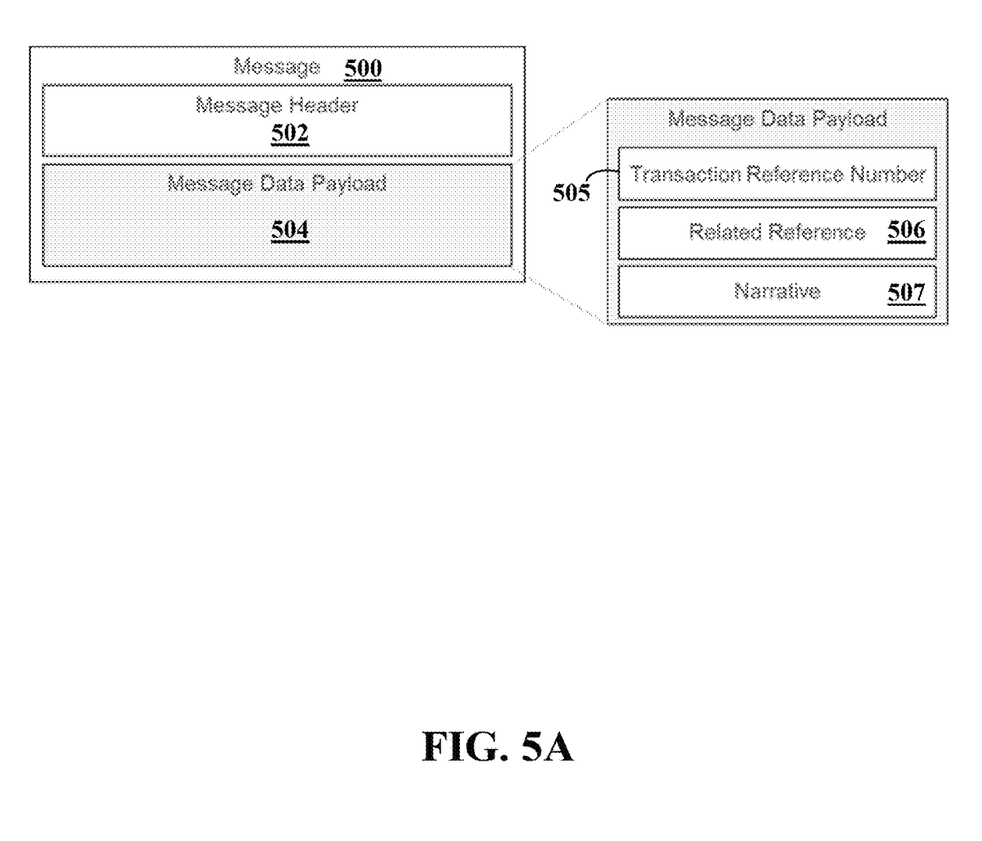
FIGS. 5A to 5C illustrate an example message structure for securely sharing or exchanging public blockchain addresses across computing systems, according to an embodiment.
Figure 5B:
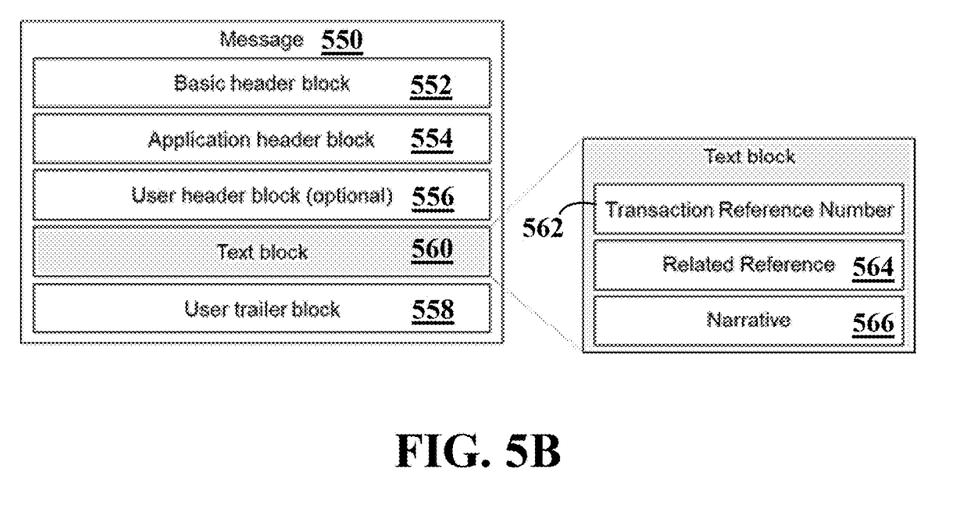
Figure 5C:
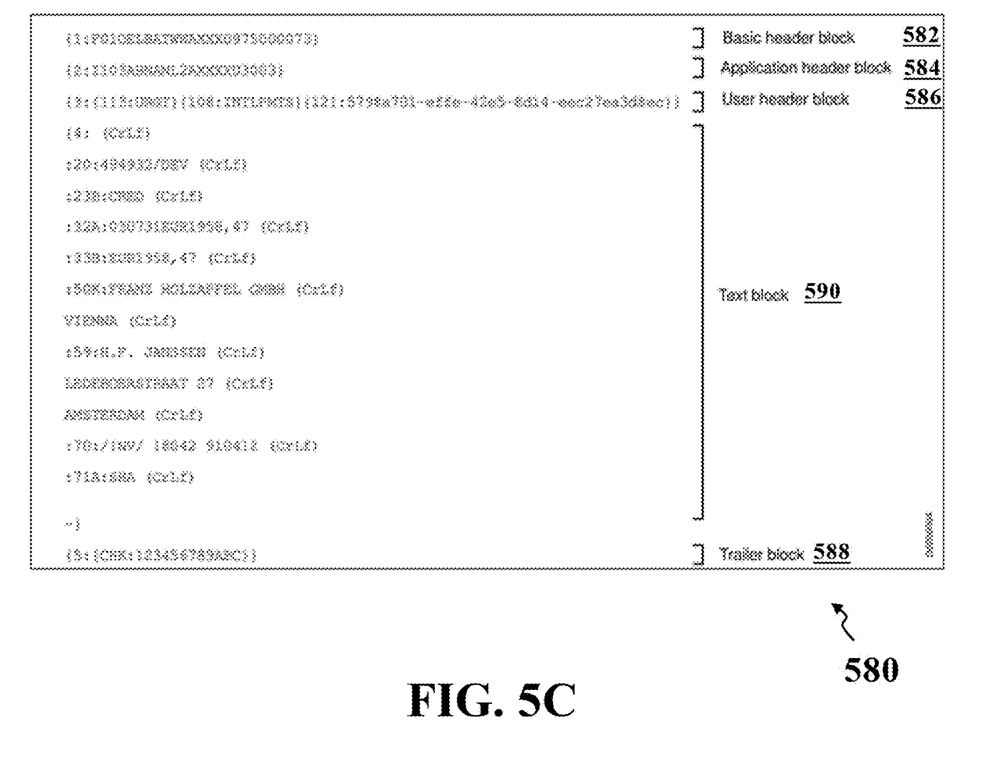

FIGS. 5A to 5C illustrate an example message structure for securely sharing public blockchain addresses across computing systems, according to an embodiment.

Referring FIG. 5A, a system for securely sharing or exchanging public blockchain addresses may use a message structure 500 including a message header 502 and a message data payload 504. The message data payload 504 may include a transaction reference number (or transaction identifier) 505, a related reference (or alternative transaction identifier) 506, and/or a narrative 507. The message data payload 504 may be similar to a message structure of SWIFT network (for example, SWIFT ISO 15022 standard message type MTx99 such as MT199 or MT299 or MT599), but embodiments of the present disclosure are not limited thereto. Each of the transaction reference number 505 and the related reference 506 may store a transaction identifier associated with a specific transaction. The transaction reference number 505 may indicate that the message is associated with the specific transaction in a first address sharing process. The related reference 506 may indicate that the message is associated with the specific transaction in a second address sharing process. A transaction can include multiple address sharing processes, so the transaction reference number 505 and the related reference 506 can be different. For example, multiple addresses can be contained in the "narrative" field (e.g., field 507 in FIG. 5A) so that there is no need to provide a new one for each transaction. Addresses can be shared in advance to prepare a "pool" of addresses for future use. The narrative 507 may store data relating to specific steps within an address sharing process (e.g., data relating to steps 410 to 470 in FIG. 4). For example, the narrative 507 may include information on monetary amount, wallet address or address of public blockchain, and/or confirmation (or denial) of validation or verification result. The narrative 507 may be encrypted and/or signed. To encrypt/decrypt the narrative 507, parties (e.g., device SD 401 and device RD 402 in FIG. 4) may first share a public key of each counter party. Then, if sharing of the public keys is confirmed, one party may encrypt a narrative of a message using the public key of the other party the message is sent to. The narrative 507 may contain up to 35 lines with 50 characters in each line. The system may obtain or access or parse information from the narrative 507 according to metadata relating to a transaction, the metadata representing a monetary amount, a transaction identifier, and/or a wallet address of a cryptocurrency account, for example FIG. 5B shows another example of message structure and FIG. 5C shows example data 580 corresponding to fields of the message structure shown in FIG. 5B.

Referring FIG. 5B, a system may use a message structure 550 including a message header block 552 (corresponding data 582 shown in FIG. 5C), an application header block 554 (corresponding data 584 shown in FIG. 5C), a user header block 556 (optional; corresponding data 586 shown in FIG. 5C), a text block 560 (corresponding data 590 shown in FIG. 5C), and a user trailer block 558 (corresponding data 588 shown in FIG. 5C). The message header block 552 may contain information about the source of the message. The application header block 554 may contain information about the message type and the destination of the message. The user header block 556 may contain special processing instructions. The user trailer block 558 may either indicate special circumstances that relate to message handling or contain security information.

The text block 590 may include a transaction reference number 562, a related reference 564, and/or a narrative 566, which contain information similar to that of transaction reference number 505, related reference 506, and/or narrative 507, respectively, as described above with reference to FIG. 5A.

Figure 6A:
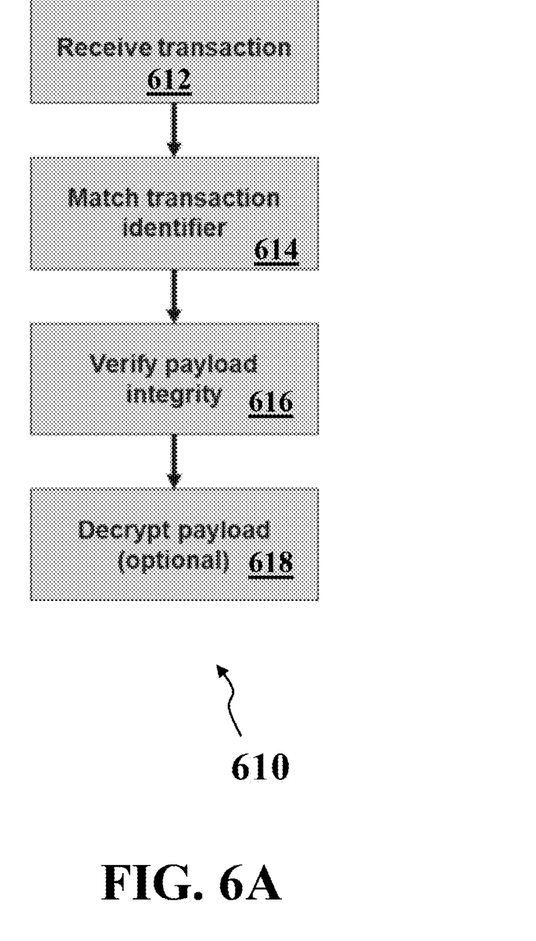
FIGS. 6A and 6B illustrate example transaction flows of securely sharing or exchanging public blockchain addresses across computing systems, according to an embodiment.
Figure 6B:
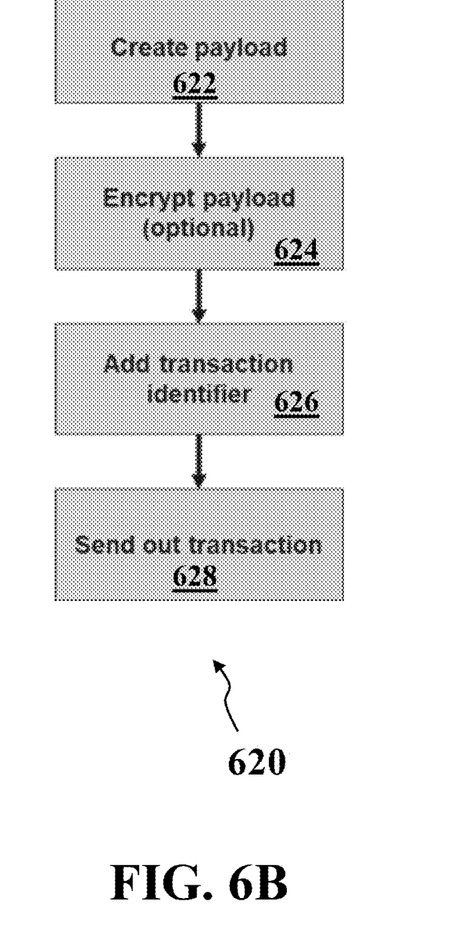

FIGS. 6A and 6B illustrate example transaction flows of securely sharing public blockchain addresses across computing systems, according to an embodiment.

Referring to FIG. 6A, a flow 610 of receiving a first transaction message may include receiving a message including a first transaction identifier and a payload (step 612). The first transaction message may have a message format or structure similar to those shown in FIGS. 5A to 5C. For example, the first transaction identifier and the payload may be stored in the fields of transaction reference number and narrative, respectively. The flow 610 may match the first transaction identifier to a first transaction (step 614). The flow 610 may verify integrity of the payload of the first transaction message by checking any errors in the payload (e.g., using error detection and correction) (step 616). The flow 610 may determine whether the payload is encrypted (e.g., by checking a field of the first transaction message). In response to determining that the payload is encrypted, the flow 610 may decrypt the payload (step 618). The flow 610 may be performed by a recipient of a transaction (e.g., device RD 402 in FIG. 4) or by a sender of a transaction (e.g., device SD 401 in FIG. 4).

Referring to FIG. 6B, a flow 620 of sending a second transaction message may include creating a message including a payload relating to data of a second transaction (step 622). The second transaction message may have a message format or structure similar to those shown in FIGS. 5A to 5C. The flow 620 may encrypt the payload (step 624). The flow 620 may add, to the second transaction message, a second transaction identifier associated with the second transaction (step 626). The second transaction message may have a message format or structure similar to those shown in FIGS. 5A to 5C. For example, the second transaction identifier and the payload may be stored in the fields of transaction reference number and narrative, respectively. The flow 620 may send out the second transaction message. The flow 620 may be performed by a sender of a transaction (e.g., device SD 401 in FIG. 4) or by a recipient of a transaction (e.g., device RD 402 in FIG. 4).

A system may perform address sharing (e.g., sharing of public blockchain address) on a transaction by transaction basis, such that each address can be shared separately and an authentication step (e.g., authenticating the other party) and encryption/decryption steps (e.g., step 618 in FIG. 6A and step 624 in FIG. 6B) can be done each time.

A system may perform address sharing using "streams." The system may generate or initiate a stream by establishing a secure channel between two parties such that the stream or the channel will remain active for a pre-determined amount of time. As long as the channel is active, there is no need to re-establish the encryption or authenticate the other party. The "related reference" field (e.g., field 506 or field 564 in FIG. 5A and FIG. 5B) may contain a channel identifier (channel ID) to identify the current secure channel (or stream). In this manner, each address (e.g., public blockchain address) can be shared per stream, and an authentication step (e.g., authenticating the other party). During the pre-determined amount of time for a stream, an authentication step (e.g., authenticating the other party) and encryption/decryption steps (e.g., step 618 in FIG. 6A and step 624 in FIG. 6B) can be done only once and multiple transactions can be processed.

A system may share more than one (public blockchain) address (or perform address batching) such that multiple addresses can be shared at parallel. It may be up to the parties to determine how to manage the processes (e.g., how to process multiple addresses) on their end. Multiple addresses can be set in the same message. For example, multiple addresses can be contained in the "narrative" field (e.g., field 507 in FIG. 5A or field 566 in FIG. 5B). Addresses can be shared in advance to prepare a "pool" of addresses for future use. Such a pool of addresses may be generated and/or maintained by (1) exchanging an extended public key (XPUB) seed for a hierarchical deterministic (HD) wallet and (2) deriving child public keys as part of the HD wallet.

A system for securely sharing public blockchain addresses across computing systems may perform error detection and correction on messages. The system may include, in messages, error detection and correction characters to perform error detection and correction controls (e.g., parity check (PC) or Cyclic Redundancy Check (CRC)). The system may include, in a blockchain transaction, one or more verification elements, if the blockchain protocol supports the inclusion. For example, the system may include a transaction identifier in a blockchain transaction. The system may include one or more metadata elements in a blockchain transaction, if the blockchain protocol supports the inclusion. For example, the system may include a pre-shared key pair in a blockchain transaction so as to sign a blockchain transaction using the pre-shared key pair.

A system for securely sharing public blockchain addresses across computing systems may encrypt data payload (e.g., "narrative" fields in FIGS. 5A to 5C; also see step 624 in FIG. 6B). In addition to performing a "penny" test (e.g., steps 430 to 450 in FIG. 4), the system can include additional iterations for higher security (e.g., sending small amounts and confirming it multiple times).

The system may use an instant messaging service (such as Symphony Communication Services) as a payment rail alternative to the secure network session (e.g., SWIFT network session). Such an instant messaging service may be person specific. The use of an instant messaging service has pros and cons compared to the secure network session. For example, such an instant messaging service may provide a better routing but less security, than the SWIFT network.

Figure 7:
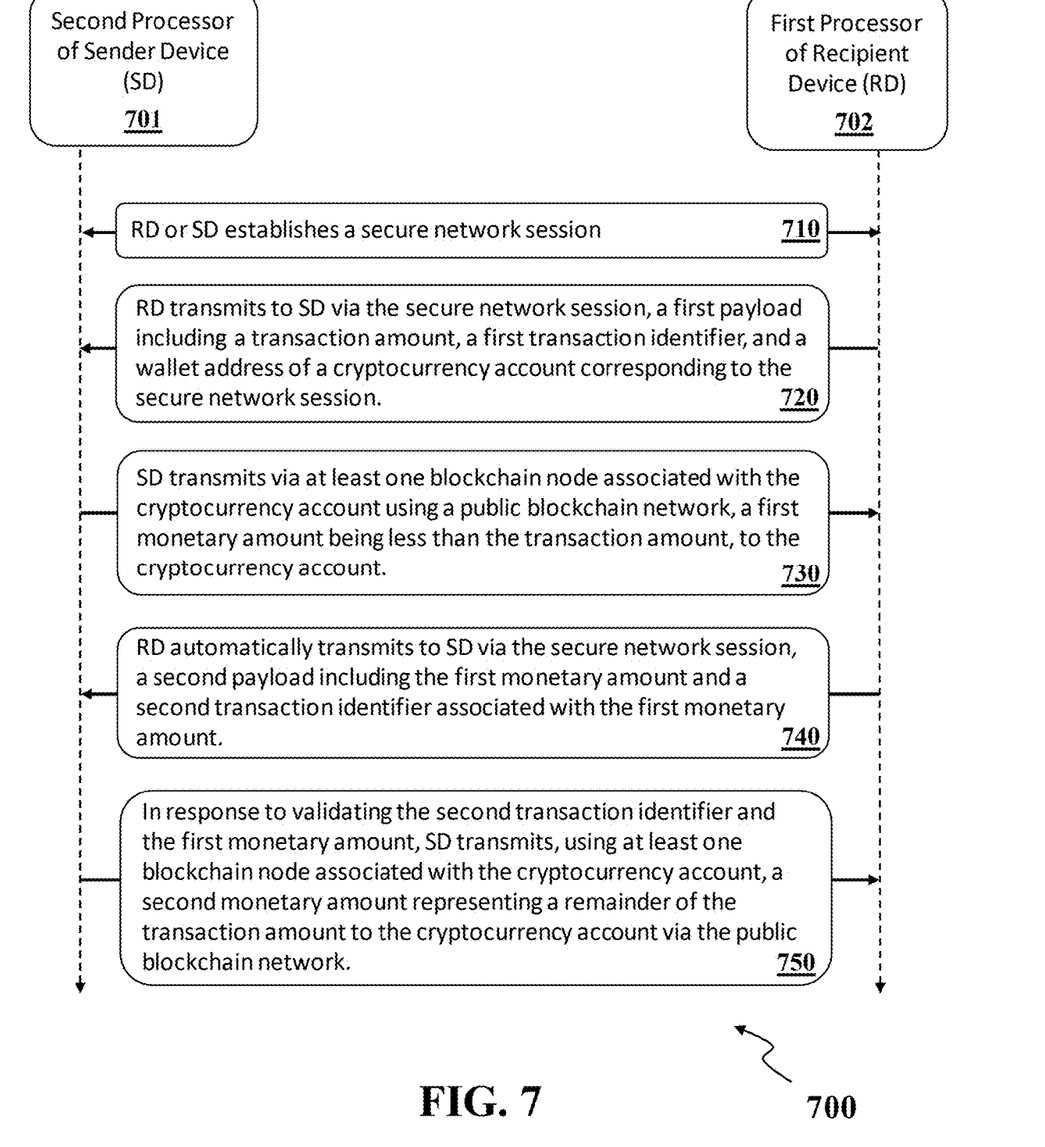
FIG. 7 illustrates a flowchart depicting operational steps for securely sharing or exchanging public blockchain addresses across computing systems, according to an embodiment.

FIG. 7 illustrates a flowchart depicting operational steps for securely sharing public blockchain addresses across computing systems, according to an embodiment. Other embodiments of executing the method 700 may comprise additional or alternative steps, or may omit some steps altogether. A sender device SD 701 and a receiver RD 702 in FIG. 7 may have configurations similar to those of the devices SD 401 and RD 402 in FIG. 4. Each of the steps of the method 700 may be performed by one or a combination of the analytic nodes (e.g., analytic nodes 110 in FIG. 1), a first computing device (e.g., client device 131 in FIG. 1, enterprise infrastructure 350 in FIG. 3, device SD 401 or RD 402 in FIG. 4, device SD 701 or RD 702 in FIG. 7), or a second computing device (e.g., client device 141 in FIG. 1, enterprise infrastructure 350 in FIG. 3, device SD 401 or RD 402 in FIG. 4, device SD 701 or RD 702 in FIG. 7).

At step 710, a first processor (e.g., processor of receiver device RD 702 in FIG. 7) or second processor (e.g., processor of sender device SD 701 in FIG. 7) may establish a secure network session (e.g., secured network 160 in FIG. 1 or secured network infrastructure 310 in FIG. 3) between the first processor and the second processor.

At step 720, the first processor (e.g., processor of receiver device RD 702 in FIG. 7) may transmit to the second processor (e.g., processor of sender device SD 701 in FIG. 7) via the secure network session, a first payload configured for a transaction in a public blockchain network (e.g., public blockchain network 150 in FIG. 1 or public blockchain network 330 in FIG. 3). The first payload (e.g., narrative field 507 in FIG. 5A or narrative field 566 in FIG. 5B) may include a transaction amount (e.g., 0.001 Bitcoin), a first transaction identifier (e.g., transaction identifier associated with the transaction of 0.001 Bitcoin), and a wallet address of a cryptocurrency account (e.g., public blockchain address of the receiver device RD 702) corresponding to the secure network session.

At step 730, the second processor (e.g., processor of sender device SD 701 in FIG. 7) may transmit via at least one blockchain node (e.g., blockchain instances hosted on network nodes 120a-c in FIG. 1) associated with the cryptocurrency account using the public blockchain network, a first monetary amount (e.g., 0.0000002 Bitcoin) being less than the transaction amount (e.g., 0.001 Bitcoin), to the cryptocurrency account. The first processor (e.g., processor of receiver device RD 702 in FIG. 7) may receive, from at least one blockchain node associated with the cryptocurrency account, an indication that the cryptocurrency account has received a first monetary amount (e.g., 0.0000002 Bitcoin) via the public blockchain network.

At step 740, in response to receiving, from at least one blockchain node associated with the cryptocurrency account, an indication that the cryptocurrency account has received a first monetary amount (e.g., 0.0000002 Bitcoin) via the public blockchain network, the first processor (e.g., processor of receiver device RD 702 in FIG. 7) may generate and automatically transmit to the second processor via the secure network session, a second payload including the first monetary amount (e.g., 0.0000002 Bitcoin) and a second transaction identifier (e.g., transaction identifier associated with the transaction of 0.0000002 Bitcoin) associated with the first monetary amount that is less than the transaction amount.

At least one of the first payload or the second payload may be encrypted (e.g., step 624 in FIG. 6B), and whereby the second processor (e.g., processor of sender device SD 701 in FIG. 7) may verify an integrity of the second payload (e.g., step 450 in FIG. 4) before transmitting the second monetary amount (e.g., step 460 in FIG. 4). The second processor may verify an integrity of the first payload or the second payload using metadata associated with each respective payload (e.g., metadata relating to a specific transaction, representing a monetary amount, a transaction identifier, and/or a wallet address of a cryptocurrency account, for example).

The first processor (e.g., processor of receiver device RD 702 in FIG. 7) or the second processor (e.g., processor of sender device SD 701 in FIG. 7) may establish an authenticated session when at least one of an integrity of the second payload has been verified by the second processor or the first processor verifies that the transaction amount has been received. The authenticated session may be established on a transaction by transaction basis, such that each address can be shared separately and an authentication step (e.g., authenticating the other party) and encryption/decryption steps (e.g., step 618 in FIG. 6A and step 624 in FIG. 6B) can be done each time. The authenticated session may be established using streams, such that during the authenticated session for a stream, an authentication step and encryption/decryption steps can be done only once and multiple transactions can be processed.

At least one of the first transaction identifier or the second transaction identifier may be unique to the second processor (e.g., sender device SD 701 in FIG. 7). At least one of the first transaction identifier or the second transaction identifier may be unique to the transaction. At least one of the first transaction identifier or the second transaction identifier may be unique to the authenticated session for a stream.

The first payload may include a plurality of transaction amounts corresponding to a plurality of transactions associated with the second processor, a plurality of first transaction identifiers, and a plurality of wallet addresses of one or more cryptocurrency accounts. For example, more than one (public blockchain) address may be shared such that multiple addresses can be shared at parallel. Multiple addresses can be set in the same message. For example, multiple addresses can be contained in the "narrative" field (e.g., field 507 in FIG. 5A or field 566 in FIG. 5B).

At step 750, in response to validating the second transaction identifier and the first monetary amount (e.g., step 450 in FIG. 4), the second processor (e.g., sender device SD 701 in FIG. 7) may transmit, using at least one blockchain node associated with the cryptocurrency account, a second monetary amount (e.g., 0.00099908 Bitcoin) representing a remainder of the transaction amount to the cryptocurrency account via the public blockchain network (e.g., step 460 in FIG. 4).

The first processor (e.g., receiver device RD 702 in FIG. 7) may receive, from at least one node associated with the cryptocurrency account, a second indication that the cryptocurrency account has received the second monetary amount (e.g., 0.00099908 Bitcoin). The first processor (e.g., receiver device RD 702 in FIG. 7) may transmit, to the second processor (e.g., sender device SD 701 in FIG. 7) via the secure network, a third payload including a second monetary amount (e.g., 0.00099908 Bitcoin) and a third transaction identifier (e.g., transaction identifier associated with the transaction of 0.00099908 Bitcoin).

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system comprising:
a first computing device comprising a first processor; and
a second computing device comprising a second processor,
wherein the first processor is configured to:
establish a secure network banking session (SNBS) with the second processor, wherein the SNBS is active for an amount of time for a cryptocurrency transaction of a monetary amount of cryptocurrency;
generate a request for a wallet address of a cryptocurrency account associated with the second processor for the cryptocurrency transaction;
encrypt the request to generate an encrypted request;
transmit via the SNBS to the second processor, the encrypted request;
decrypt the encrypted first payload to access the first payload;
in response to decrypting the encrypted first payload, transmit, via a public blockchain network (PBN) to the cryptocurrency account associated with the second processor, a first amount of cryptocurrency, wherein the first amount of cryptocurrency is less than the monetary amount of cryptocurrency;
decrypt the encrypted second payload to access the second payload;
in response to decrypting the encrypted second payload,
validate the first amount of cryptocurrency within the second payload to generate a first validation result;
encrypt the first validation result to generate an encrypted first validation result;
transmit, via the SNBS to the second processor, the encrypted first validation result; and
transmit, via the PBN to the cryptocurrency account, a second amount of cryptocurrency, wherein the second amount of cryptocurrency represents a remainder of the monetary amount of cryptocurrency; and
wherein the second processor is configured to:
establish the SNBS with the first processor;
decrypt the encrypted request to access the request;

in response to decrypting the encrypted request, generate a first payload comprising the monetary amount of cryptocurrency, the wallet address of the cryptocurrency account associated with the second processor, and a first transaction identifier corresponding to the cryptocurrency transaction;
encrypt the first payload to generate an encrypted first payload;
transmit, via the SNBS to the first processor, the encrypted first payload;
receive, via the PBN from at least one blockchain node associated with the cryptocurrency account, a first indication that the cryptocurrency account associated with the second processor has received the first amount of cryptocurrency;
in response to receiving the first indication, generate a second payload comprising the first amount of cryptocurrency, and a second transaction identifier associated with the first amount of cryptocurrency;
encrypt the second payload to generate an encrypted second payload;
transmit, via the SNBS to the first processor, the encrypted second payload; and
receive, via the PBN from at least one blockchain node associated with the cryptocurrency account, a second indication that the cryptocurrency account associated with the second processor has received the second amount of cryptocurrency.

2. The system of claim 1,
wherein the second processor is further configured to:
generate a third payload comprising a third amount of cryptocurrency for a second cryptocurrency transaction, and a third transaction identifier associated with the third amount of cryptocurrency;
encrypt the third payload to generate an encrypted third payload;
transmit, via the SNBS to the first processor, the encrypted third payload; and
wherein the first processor is further configured to:
decrypt the encrypted third payload to access the third payload.

3. The system of claim 2, wherein the first processor is further configured to:
in response to decrypting the encrypted third payload, validate the third amount of cryptocurrency within the third payload to generate a second validation result;
encrypt the second validation result to generate an encrypted second validation result; and
transmit, via the SNBS to the second processor, the encrypted second validation result.

4. The system of claim 1, wherein the first payload comprises a plurality of transaction amounts of cryptocurrency corresponding to a plurality of cryptocurrency transactions associated with the second processor, a plurality of first transaction identifiers, and a plurality of wallet addresses of one or more cryptocurrency accounts.

5. The system of claim 1, whereby the second processor is configured to verify an integrity of the first payload or the second payload using metadata associated with each respective payload.

6. The system of claim 1, wherein at least one of the first transaction identifier or the second transaction identifier is unique to the second processor.

7. The system of claim 1, wherein at least one of the first transaction identifier or the second transaction identifier is unique to the transaction.

8. A method comprising:
establishing a secure network banking session (SNBS) between a first processor of a first computing device and a second processor of a second computing device, wherein the SNBS is active for an amount of time for a cryptocurrency transaction of a monetary amount of cryptocurrency;
generating, by the first processor, a request for a wallet address of a cryptocurrency account associated with the second processor for the cryptocurrency transaction;
encrypting, by the first processor, the request to generate an encrypted request;
transmitting, by the first processor via the SNBS to the second processor, the encrypted request;
decrypting, by the second processor, the encrypted request to access the request;
in response to decrypting the encrypted request, generating, by the second processor, a first payload comprising the monetary amount of cryptocurrency, the wallet address of the cryptocurrency account associated with the second processor, and a first transaction identifier corresponding to the cryptocurrency transaction;
encrypting, by the second processor, the first payload to generate an encrypted first payload;
transmitting, by the second processor via the SNBS to the first processor, the encrypted first payload;
decrypting, by the first processor, the encrypted first payload to access the first payload;
in response to decrypting the encrypted first payload, transmitting, by the first processor via a public blockchain network (PBN) to the cryptocurrency account associated with the second processor, a first amount of cryptocurrency, wherein the first amount of cryptocurrency is less than the monetary amount of cryptocurrency;
receiving, by the second processor via the PBN from at least one blockchain node associated with the cryptocurrency account, a first indication that the cryptocurrency account associated with the second processor has received the first amount of cryptocurrency;
in response to receiving the first indication, generating, by the second processor, a second payload comprising the first amount of cryptocurrency, and a second transaction identifier associated with the first amount of cryptocurrency;
encrypting, by the second processor, the second payload to generate an encrypted second payload;
transmitting, by the second processor via the SNBS to the first processor, the encrypted second payload;
decrypting, by the first processor, the encrypted second payload to access the second payload;
in response to decrypting the encrypted second payload, validating, by the first processor, the first amount of cryptocurrency within the second payload to generate a first validation result;
encrypting, by the first processor, the first validation result to generate an encrypted first validation result;
transmitting, by the first processor via the SNBS to the second processor, the encrypted first validation result;
transmitting, by the first processor via the PBN to the cryptocurrency account, a second amount of cryptocurrency, wherein the second amount of cryptocurrency represents a remainder of the monetary amount of cryptocurrency; and
receiving, by the second processor via the PBN from at least one blockchain node associated with the cryptocurrency account, a second indication that the cryptocurrency account associated with the second processor has received the second amount of cryptocurrency.

9. The method of claim 8, further comprising:

generating, by the second processor, a third payload comprising a third amount of cryptocurrency for a second cryptocurrency transaction, and a third transaction identifier associated with the third amount of cryptocurrency;

encrypting, by the second processor, the third payload to generate an encrypted third payload;

transmitting, by the second processor via the SNBS to the first processor, the encrypted third payload; and decrypting, by the first processor, the encrypted third payload to access the third payload.

10. The method of claim 9, further comprising:

in response to decrypting the encrypted third payload, validating, by the first processor, the third amount of cryptocurrency within the third payload to generate a second validation result;

encrypting, by the first processor, the second validation result to generate an encrypted second validation result; and transmitting, by the first processor via the SNBS to the second processor, the encrypted second validation result.

11. The method of claim 8, wherein the first payload comprises a plurality of transaction amounts of cryptocurrency corresponding to a plurality of cryptocurrency transactions associated with the second processor, a plurality of first transaction identifiers, and a plurality of wallet addresses of one or more cryptocurrency accounts.

12. The method of claim 8, whereby the second processor verifies an integrity of the first payload or the second payload using metadata associated with each respective payload.

13. The method of claim 8, wherein at least one of the first transaction identifier or the second transaction identifier is unique to the second processor.

14. The method of claim 8, wherein at least one of the first transaction identifier or the second transaction identifier is unique to the transaction.

* * * * *